E. E. MINARD.
AIR AND OIL FILTER.
APPLICATION FILED MAR. 24, 1917.
1,289,512.
Patented Dec. 31, 1918.
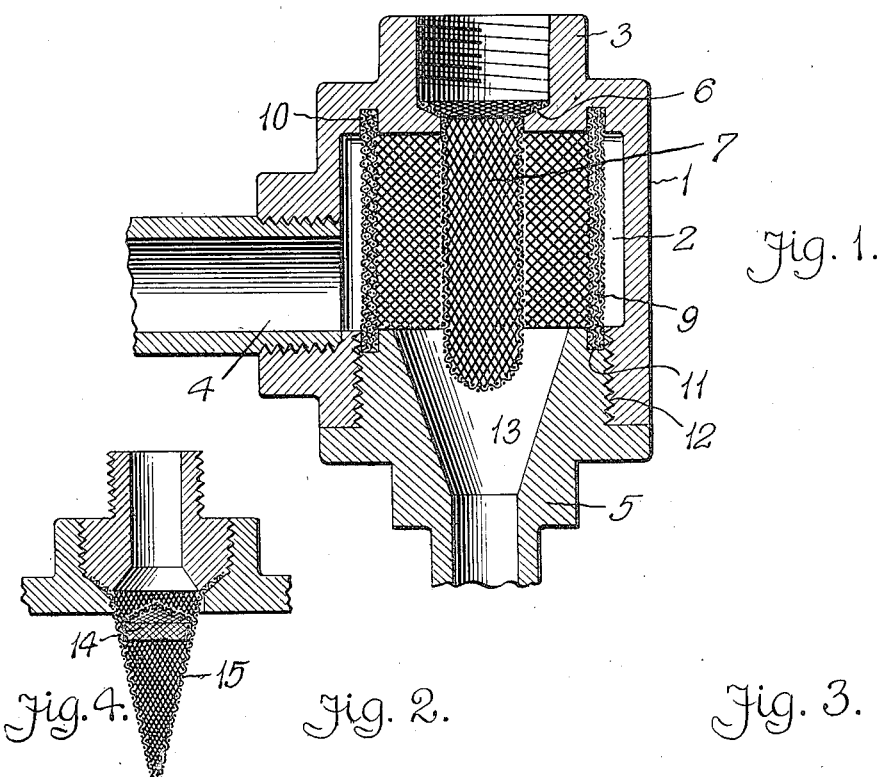
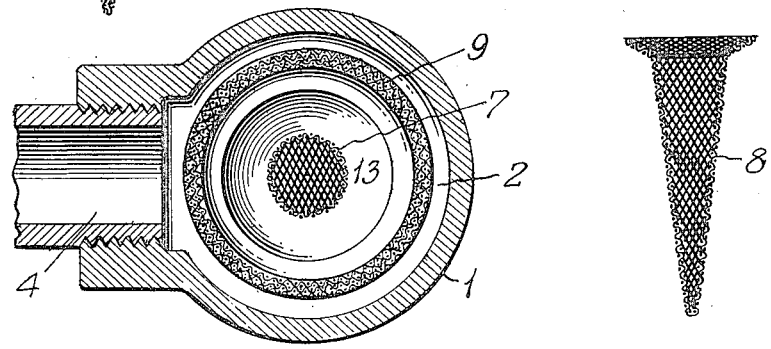
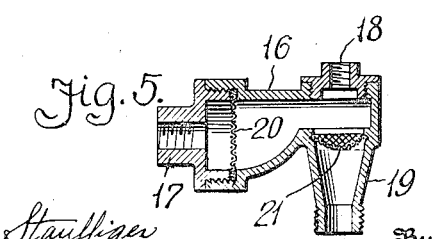
Witness
Chas. W. Stauffiger
Karl H. Butler
Inventor
Ernest E. Minard,
By
Attorneys

UNITED STATES PATENT OFFICE.

ERNEST E. MINARD, OF DETROIT, MICHIGAN.

AIR AND OIL FILTER.

1,289,512.  Specification of Letters Patent.  Patented Dec. 31, 1918.

Application filed March 24, 1917. Serial No. 157,158.

*To all whom it may concern:*

Be it known that I, ERNEST E. MINARD, a citizen of the United States of America, residing at Detroit, in the county of Wayne and State of Michigan, have invented certain new and useful Improvements in Air and Oil Filters, of which the following is a specification, reference being had therein to the accompanying drawings.

This invention relates to an air and oil filter, and has special reference to a filtering device that can be advantageously used in connection with the operating mechanisms of pneumatic cylinder.

The primary object of my invention is to provide a filtering device wherein positive and reliable means are employed, in a manner as hereinafter set forth, for removing abrasive or foreign substances from air and oil, that might prove injurious to bearing surfaces or other parts with which the air and oil contacts.

Another object of my invention is to provide a filtering device for air and oil wherein screens or sieves are disposed as strainers, that may be removed and cleansed from time to time. The strainers for the oil or lubricant is disposed so that the air admitted to the filtering device will impinge against the walls of the strainer, enter the same, and force the lubricant through the fine interstices of the strainer. The air will also cause a suction in the device which will pull the lubricant from the strainer, causing the lubricant to be broken up when passing through the strainer walls, thus placing it in such condition that it may intimately commingle with the air and provide a very fine coating or film of lubricant on bearing surfaces with which it may contact.

A further object of my invention is to provide a filtering device wherein the parts are constructed with a view of reducing the cost of manufacture, and at the same time retain those features by which durability and ease of assembling are secured.

With such ends in view, my invention resides in the novel construction to be hereinafter specifically described and then claimed.

Reference will now be had to the drawing, wherein —

Figure 1 is a vertical sectional view of the filtering device;

Fig. 2 is a horizontal sectional view of the same;

Fig. 3 is a vertical sectional view of a modified form of strainer, and

Figs. 4 and 5 are detail sectional views of another modification of my invention.

In the drawings, 1 denotes a filter body somewhat similar to a three-way or T connection, said body having a cylindrical chamber 2, an oil inlet connection 3, an air inlet connection 4, and a combined air and oil outlet connection 5.

The oil inlet connection 3 is preferably at the top of the filter body 1 and said connection is adapted to receive an oil supply pipe. The inner end of the connection has an annular flange 6 providing an annular seat for the upper flared or flanged end of an oil strainer 7. This oil strainer may be made of interwoven wire of a fine mesh and in shape to conform somewhat to an inverted mantle, said strainer being cylindrical the greater part of its length and terminating in a rounded closed end which extends into the outlet connection 5. The strainer is supported centrally of the hollow filter body 1 with its foraminous walls communicating with said body so that a lubricant deposited in the strainer may pass through the walls thereof and enter the body 1. In some instances, an inverted conical shaped strainer 8 may be used in lieu of this cylindrical form, and this form of strainer has been used in Fig. 3.

Surrounding the oil strainer 7 and in spaced relation to the inner walls of the body 1 is a cylindrical or tubular air strainer 9, which may be made of a strip of woven wire of fine mesh coiled to provide a plurality of thicknesses or laminations thus providing very fine interstices through which air must pass to reach the outlet connection 5. To hold this type of strainer in position, the inner top wall of the body 1 has an annular groove 10 for the upper edges of the strainer, and the lower edges of the strainer are positioned and held on an annular shoulder 11 of the outlet connection 5, said outlet connection being connected to the filter body 1, by screw threads 12. Such connection permits of the cylindrical strainer 9 being easily installed, readily removed and cleansed. The outlet connection 5 has a conical opening 13 into the filter body 1 and the central oil strainer extends into the opening so that oil drawn therefrom will be carried into the outlet connection.

The passage of air from the inlet connection 4 to the outlet connection 5 will produce a suction at the oil strainer as there will be a certain reduction of atmospheric pressure, and this suction toward the outlet connection 5 will pull the oil from the strainer, causing fine particles thereof to be carried by the air to parts of a pneumatic cylinder or other device to be lubricated. The filter serves as an air and oil mixer and the oil-laden air will cause a film to be deposited that will insure a constant lubrication of such parts that the air contacts with. The strainers will positively prevent deleterious matter from being carried into the outlet connection by air or oil, and since either strainer can be readily removed, it is possible to maintain the filtering device in a clean condition precluding any possibility of the strainers becoming clogged or inactive for the purposes employed.

In Fig. 4 of the drawing there is shown a slight modification of my invention wherein a deflector or conical member 14 is mounted in a suspended strainer 15. The conical deflector 14 may be of a foraminous material or may be solid and suitably seated or secured in the strainer 15. The deflector is adapted to cause a lubricant to flow to the side walls of the strainer 15 and in this manner be distributed about the strainer so that the lubricant will be thoroughly subjected to the action of air passing through the filter body and consequently can thoroughly commingle or mix with the air. It is therefore practically impossible for globules of oil to pass into the outlet connection of the filter body.

A further modification of my invention is shown in Fig. 5, wherein 16 is a filter body, 17 an air inlet connection, 18 a lubricant inlet connection, and 19 an outlet connection for mixed air and lubricant. A single or laminated strainer 20 is arranged across the air inlet and a single or laminated strainer 21 is suitably mounted in the outlet connection 19 below the lubricant inlet connection 18. Any lubricant deposited upon the strainer 21 will be attacked by the air and forced through the strainer and it will be noted that in this modified form of filter that the strainers can be easily and quickly assembled.

The preferred embodiments of my invention have been illustrated, but it is to be understood that the structural elements are susceptible to such variations and modifications as fall within the scope of the appended claims.

What I claim is:—

1. A filter comprising a body having two inlet connections and a single outlet connection, a strainer supported from one of said inlet connections, and a strainer surrounding the first mentioned strainer in proximity to the other inlet connection.

2. A filtering device comprising a body having two inlet connections and a single outlet connection, a central strainer in said body suspended from one inlet connection, and a strainer supported by the outlet connection of said body and surrounding said central strainer.

3. A filter comprising a body having inlet connections and a single outlet connection, a strainer suspended from one of the inlet connections centrally of said body and extending into the outlet connection thereof, and a cylindrical strainer surrounding the central strainer and having the ends thereof held by an inlet connection and the outlet connection of said body.

4. A device of the type discribed comprising a body having an oil inlet connection and air inlet and outlet connections, a strainer suspended from the oil inlet connection of said body and extending into the air outlet connection thereof, and a laminated strainer in said body having the ends thereof held by the oil inlet connection and air outlet connection of said body.

5. Means for filtering and mixing air and a lubricant comprising a body having an outlet and air and lubricant inlet connections, and strainers in said body with one of said strainers supported by the bottom of said body to form an annular wall to filter the air and the other strainer disposed within the first mentioned strainer and axially of the lubricant inlet connection of said body, to hold lubricant in suspension to be attacked by the air.

In testimony whereof I affix my signature in the presence of two witnesses.

ERNEST E. MINARD.

Witnesses:
KARL H. BUTLER,
ANNA M. DORR.